(12) United States Patent
Heinrichs et al.

(10) Patent No.: US 9,047,360 B2
(45) Date of Patent: *Jun. 2, 2015

(54) APPARATUS AND METHOD FOR CONTROLLING A COMPUTER SYSTEM WITH AT LEAST TWO POWER SUPPLY UNITS

(75) Inventors: Hans-Jürgen Heinrichs, Altenbeken (DE); Manfred Götz, Brakel (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 428 days.

This patent is subject to a terminal disclaimer.

(21) Appl. No.: 13/305,269

(22) Filed: Nov. 28, 2011

(65) Prior Publication Data

US 2012/0144183 A1     Jun. 7, 2012

Related U.S. Application Data

(63) Continuation-in-part of application No. 13/132,238, filed as application No. PCT/EP2009/066068 on Nov. 30, 2009.

(30) Foreign Application Priority Data

Dec. 8, 2008   (DE) .......................... 10 2008 061 034

(51) Int. Cl.
   *G06F 1/24*     (2006.01)
   *G06F 11/30*    (2006.01)
   *G06F 1/26*     (2006.01)

(52) U.S. Cl.
   CPC ............ *G06F 11/3058* (2013.01); *G06F 1/263* (2013.01); *G06F 11/3062* (2013.01)

(58) Field of Classification Search
   USPC ........................................ 713/100, 300, 320
   See application file for complete search history.

(56) References Cited

U.S. PATENT DOCUMENTS

| 5,761,084 | A  |   | 6/1998 | Edwards |
| 6,345,369 | B1 | * | 2/2002 | Kitamorn et al. ............... 714/14 |
| 6,625,736 | B1 |   | 9/2003 | Berthaud et al. |
| 7,013,399 | B2 |   | 3/2006 | Sisler et al. |
| 7,529,949 | B1 | * | 5/2009 | Ranganathan et al. ....... 713/300 |
| 2005/0044453 | A1 | | 2/2005 | Dunstan et al. |
| 2005/0144491 | A1 | | 6/2005 | Zayas |
| 2005/0172157 | A1 | | 8/2005 | Artman et al. |

(Continued)

FOREIGN PATENT DOCUMENTS

| EP | 1555595 A2   | 7/2005 |
| JP | 09-204240 A  | 8/1997 |

(Continued)

*Primary Examiner* — Jaweed A Abbaszadeh
*Assistant Examiner* — Alyaa T Mazyad
(74) *Attorney, Agent, or Firm* — DLA Piper LLP (US)

(57) ABSTRACT

A computer system includes at least two power supply units providing an output-side operating voltage from at least one input-side supply voltage, at least one power-consuming component operated in at least one normal operating mode with a first power consumption and operated in a restricted operating mode with at least one second power consumption lower than the first power consumption, the power-consuming component electrically coupled to the at least two power supply units; a controller coupled to the at least two power supply units and the power-consuming component; and at least one management component coupled to the controller.

10 Claims, 4 Drawing Sheets

(56) References Cited

U.S. PATENT DOCUMENTS

| | | |
|---|---|---|
| 2006/0161794 A1 | 7/2006 | Chiasson et al. |
| 2006/0174143 A1* | 8/2006 | Sawyers et al. ............... 713/300 |
| 2006/0274764 A1 | 12/2006 | Mah et al. |
| 2007/0180117 A1* | 8/2007 | Matsumoto et al. .......... 709/226 |
| 2007/0250218 A1* | 10/2007 | Culley .......................... 700/295 |
| 2007/0278020 A1 | 12/2007 | Harris et al. |
| 2008/0028244 A1* | 1/2008 | Capps et al. .................. 713/324 |
| 2008/0178019 A1 | 7/2008 | McGrane et al. |
| 2009/0307514 A1 | 12/2009 | Roberts et al. |

FOREIGN PATENT DOCUMENTS

| | | |
|---|---|---|
| JP | 2002-189540 A | 7/2002 |
| JP | 2005-202506 A | 7/2005 |
| JP | 2008-258377 A | 10/2008 |

* cited by examiner

APPARATUS AND METHOD FOR CONTROLLING A COMPUTER SYSTEM WITH AT LEAST TWO POWER SUPPLY UNITS

RELATED APPLICATIONS

This application is a continuation-in-part of U.S. application Ser. No. 13/132,238, filed on Jul. 14, 2011, which is a §371 of International Application No. PCT/EP2009/066068, with an international filing date of Nov. 30, 2009 (WO 2010/076106 A1, published Jul. 8, 2010), which is based on German Patent Application No. 10 2008 061 034.8, filed on Dec. 8, 2008.

TECHNICAL FIELD

This disclosure relates to a computer system comprising at least two power supply units for producing an output-side operating voltage from at least one input-side supply voltage and at least one power-consuming component which is electrically coupled to the at least two power supply units. In addition, the disclosure relates to a method for controlling a computer system having a power-consuming component and at least two power supply units for providing an operating voltage for the power-consuming component.

BACKGROUND

Computer systems having at least two power supply units for producing an operating voltage for at least one power-consuming component are widely known. In the field of high-performance or high-availability servers in particular, power supply units are frequently designed in a redundant manner, with the result that it is still possible to operate the computer system even when one or possibly more power supply units fail. In addition, further computer systems having redundant power supply units are known, for example, from the field of telecommunications and control and monitoring systems.

The number and performance of the redundant power supply units may be different depending on the power consumption of the power-consuming component. In particular, more than one high-performance redundant power supply unit is often provided in this case in so-called "high-availability" systems.

The known computer systems have two fundamental disadvantages. On the one hand, each power supply unit must be designed to be more powerful than is necessary for normal operation. Only in this manner can it be ensured that the remaining power supply units are not loaded beyond their maximum output power even when a power supply unit fails. This leads, inter alia, to increased costs of the computer system since particularly powerful power supply units are more expensive than medium-performance or lower-performance power supply units.

In addition, all power supply units in the known computer systems are generally active and contribute to supplying the power-consuming component. Consequently, each power supply unit is operated well below its maximum rated output power during normal operation. However, this reduces the energy efficiency in the case of switched-mode power supplies and similar converter circuits for producing an output-side operating voltage from at least one input-side supply voltage. This is because it is advantageous to operate a power supply unit in the vicinity of its maximum output power to achieve the highest possible efficiency.

It could therefore be helpful to describe a computer system of the type mentioned above and a method for controlling the latter, which computer system solves or diminishes the above-mentioned problems. In this case, the failure safety of the computer system as a whole and, in particular, the power supply for the power-supplying component should be ensured even when at least one power supply unit fails. In addition, the computer system should have the simplest possible construction and be able to be produced in a cost-effective manner.

SUMMARY

A computer system includes at least two power supply units for providing an output side operating voltage from at least one input-side supply voltage, and at least one power-consuming component which can be operated in at least one normal operating mode with a first power consumption and can be operated in a restricted operating mode with at least one second power consumption which is lower than the first power consumption, the power-consuming component being electrically coupled to the at least two power supply units. The computer system further comprises control means which are coupled to the at least two power supply units and to the power-consuming component and are set up to monitor the function of the at least two power supply units and to switch the power-consuming component from the normal operating mode into the restricted operating mode immediately upon failure of at least one power supply unit to reduce the power consumption of the power-consuming component. Furthermore the computer system includes at least one management component which is coupled to the control means and is set up to detect a fault state when at least one power supply component fails and to subsequently change a configuration of the computer system upon detecting the fault state in order to reduce a power consumption of the computer system.

A method for controlling a computer system having a power-consuming component and a plurality of power supply units for providing an operating voltage for the power-consuming component comprises monitoring, by at least one monitoring apparatus, the at least two power supply units for a failure. If a failure of at least one power supply unit is detected a predetermined control signal is generated. When the predetermined control signal has been detected, the power-consuming component is switched immediately from a normal operating mode with a first power consumption into a restricted operating mode with a second, lower power consumption in order to effect a reduction in power consumption. Subsequently, a configuration of the computer system is changed, if the predetermined control signal has been detected.

Another method for controlling a computer system having a power-consuming component and at least two power supply units for providing an operating voltage for the power-consuming component comprises monitoring the at least two power supply units for a failure and generating a predetermined control signal, if a failure of at least one power supply unit has been detected. The method further comprises immediately switching the power-consuming component from a normal operating mode with a first power consumption into a restricted operating mode with a second, lower power consumption, if the predetermined control signal has been detected, and subsequently changing a configuration of the computer system.

LIST OF REFERENCE SYMBOLS

Figure 1:
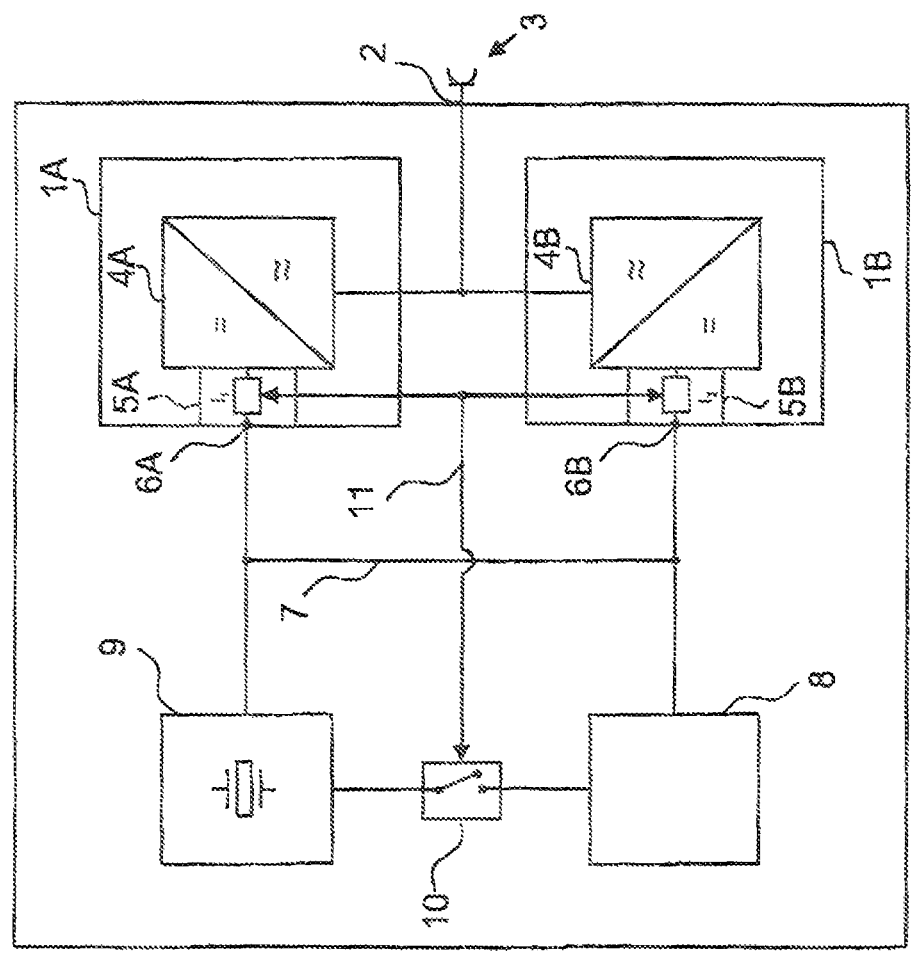
FIG. 1 shows a schematic illustration of an assembly comprising two power supply units and a power-consuming component.

1 Power supply unit
2 Voltage input
3 Supply voltage
4 Converter circuit
5 Monitoring circuit
6 Voltage output
7 Power supply line
8 Power-consuming component
9 (Primary) clock generation circuit
10 Interrupter
11 Control line
12 Computer system
13 Supply component
14 Computer unit
15 Data network
16 Remote maintenance system
17 Processor
18 Communication apparatus
19 Management component
30 Data bus
31 Voltage monitoring circuit
32 Voltage divider
33 Comparator
34 Processor core
35 (Secondary) clock generation circuit
36 Control circuit

DETAILED DESCRIPTION

We provide a computer system comprising a plurality of power supply units for producing an output-side operating voltage from at least one input-side supply voltage and at least one power-consuming component. The power-consuming component can be operated in at least one normal operating mode with a first power consumption and can be operated in a restricted operating mode with at least one second power consumption which is lower than the first power consumption. The power-consuming component is electrically coupled to the plurality of power supply units. The computer system also comprises control means coupled to the plurality of power supply units and the power-consuming component and are set up to monitor the function of the plurality of power supply units. The control means is also set up to switch the power-consuming component from the normal operating mode into the restricted operating mode when at least one power supply unit in the first subgroup fails. The result is that the power consumption of the power-consuming component is at least temporarily reduced.

The use of control means which switch the power-consuming component into a restricted operating mode with a lower power consumption when at least one power supply unit fails allows further power supply units to be dispensed with or allows correspondingly larger dimensioning of existing power supply units while simultaneously ensuring that the power-consuming component is supplied with power.

The control means may comprise at least one monitoring apparatus for generating a predetermined control signal when at least one power supply unit fails and a throttle apparatus which is coupled to the monitoring apparatus and is intended to throttle the power-consuming component when the control signal is received. The use of a monitoring apparatus for monitoring the power supply units, on the one hand, and of a throttle apparatus for throttling the power-consuming component, on the other hand, enables a particularly simple, modular design of the control means. In particular, already existing monitoring apparatuses of the power supply units and/or throttle apparatus of the power-consuming component can be used to implement the control means.

The power-consuming component may comprise a processor core and the throttle apparatus comprises a clock generation circuit to supply the processor core with an operating clock, the processor core supplied with a first operating clock in the normal operating mode by the clock generation circuit and supplied with a second, lower operating clock in the restricted operating mode. The power consumption of the power-consuming component can be easily reduced by appropriately driving or connecting a clock generation circuit for a processor core.

The processor core and the clock generation circuit may be arranged in a processor, the processor having at least one connection pin to apply the predetermined control signal. A connection pin can be used to easily supply an external control signal to an internal clock generation circuit of a process.

Each of the at least two power supply units may comprise a monitoring apparatus which is intended to monitor a permissible output power or a permissible output current and is set up to generate the predetermined control signal upon detecting that the permissible output power or the permissible output current has been exceeded. A monitoring apparatus which is integrated in the power supply unit and intended to monitor an output power or an output current can be used in a particularly simple manner to generate the required control signal.

The at least one monitoring apparatus may have a voltage monitoring circuit which is set up to compare the output-side operating voltage with a predetermined threshold value and to generate the predetermined control signal when the predetermined threshold value is undershot. Such a voltage monitoring circuit allows a voltage drop associated with failure of a power supply unit to be determined in a simple and rapid manner.

We also provide a computer system according to one of the above-mentioned examples further comprising at least one management component which is coupled to the control means and set up to detect a fault state when at least one power supply component fails. As a result of the fact that a management component which is coupled to the control means detects a fault state, the computer system can react to the failure of the power supply unit.

The management component may be coupled to a remote maintenance system via a communication apparatus and is set up to signal the fault state to the remote maintenance system. A system administrator of the computer system can be advised of the failure of the power supply unit by virtue of the fault state being signaled to a remote maintenance system.

The management component is set up to change a configuration of the computer system upon detecting the fault state to reduce a power consumption of the computer system. The power consumption of the computer system can be adapted to the changed output power of the power supply units by reconfiguring the computer system.

The management component may be set up to reset the control means after changing the configuration to switch the power-consuming component back from the restricted operating mode into the normal operating mode. If the configuration of the computer system has been changed in such a manner that the computer system can now also be operated in a reliable manner without the failed power supply unit, the power-consuming component can be switched back into the normal operating mode.

The computer system may be characterized in that the at least two power supply units together have an output power which substantially corresponds to the first power consumption of the computer system in the normal operating mode. The power supply units can be operated at an operating point with optimum efficiency by dimensioning the power supply units in accordance with the power consumption of the computer system in the normal operating mode. Furthermore, it is possible to dispense with using expensive, over-dimensioned power supply units.

The computer system may be characterized in that each of the at least two power supply units per se has an output power which substantially corresponds to the second power consumption of the computer system in the restricted operating mode. The computer system can continue to be operated in a reliable manner even when all of the power supply units, apart from one, fail by dimensioning the power supply units in accordance with the power consumption of the computer system in the restricted operating mode.

We further provide a method for controlling a computer system having a power-consuming component and a plurality of power supply units to provide an operating voltage for the power-consuming component. The method has the following steps:

the plurality of power supply Units are monitored for failure by at least one monitoring apparatus, the at least one monitoring apparatus generates a predetermined control signal if the failure of at least one active power supply unit has been detected.

the power-consuming component is switched from the normal operating mode with the first power consumption into a restricted operating mode with a second, lower power consumption if the predetermined control signal has been detected, with the result that the power consumption of the power-consuming component immediately reduced; and subsequently changing a configuration of the computer system, if the predetermined control signal has been detected.

The method may be characterized by an additional step in which the power-consuming component is switched back from the restricted operating mode into the normal operating mode if the at least one monitoring component has detected that the at least one previously failed power supply component is ready for operation again. As a result of the additional method step, the computer system can be automatically switched back into the normal operating mode when a temporary fault in a power supply unit has been eliminated.

Turning now to the drawings, FIG. 1 shows an assembly comprising two power supply units 1A and 1B. The maximum output power of the power supply units 1A and 1B is 100 Watts in each case. Both power supply units 1A and 1B are connected to a supply voltage 3, for example, a mains AC voltage of 235 volts, via a common voltage input 2.

Each of the power supply units 1A and 1B has a converter circuit 4A and 4B for producing an output-side DC voltage from the input-side supply voltage 3. For example, the converter circuits 4A and 4B may be switching converters which provide one or more stabilized output voltages of, for example, 3.3 volts, 5 volts and 12 volts for operating a computer system. To avoid damage to the converter circuit 4A and 4B, each of the power supply units 1A and 1B has a monitoring circuit 5A and 5B which monitors the output current of the converter circuit 4A and 4B. Alternatively, or in addition, the input current, voltage or power may be monitored by the monitoring circuits 5A and 5B.

A respective voltage output 6A and 6B of the first power supply unit 1A or 1B is coupled to a power supply line 7 of the assembly. The output voltage of the first and second power supply units 1A and 1B is supplied to a power-consuming component 8, for example, a processor of a computer system, and to a clock generation circuit 9 via the power supply line 7. The power-consuming component 8 and the clock generation circuit 9 together have an input power which substantially corresponds to the output power of the two power supply units 1A and 1B.

The clock generation circuit 9 is coupled to the power-consuming component 8 via an interrupter 10. The interrupter 10 is also coupled to the monitoring circuits 5A and 5B of the first power supply unit 1A and of the second power supply unit 1B via a control line 11. Providing a suitable control signal via the control line 11 thus makes it possible to temporarily prevent a clock signal from being supplied from the clock generation circuit 9 to the power-consuming component 8 or to reduce the frequency of the clock signal, which results in a rapid and considerable reduction in the power consumption of the power consuming component 8. For example, the power consumption of the power-consuming component 8 can be halved in the region of a few milliseconds.

If one of the power supply units 1A or 1B fails in the example illustrated in FIG. 1, the output current at the power supply unit 1B or 1A which is still operating increases suddenly. If, for example, the first converter circuit 4A fails completely, the entire current for operating the power-consuming component 8 and the clock generation circuit 9 must be provided by the converter circuit 4B of the second power supply unit 1B. Consequently, the output current of the converter circuit 4B exceeds a predetermined limit value, with the result that the monitoring circuit 5B responds and transmits a control signal to the interrupter 10 via the control line 11. A control circuit which is arranged in the interrupter 10, for example, but is not illustrated in FIG. 1 ensures that the clock generation circuit 9 reduces the power consumption of the power-consuming component 8 at least temporarily within a very short time upon receiving the control signal. The interruption or reduction of the clock signal, in particular, is suitable for this purpose. This avoids the remaining power supply unit 1B being overloaded. At the same time, at least the instantaneous state of the power-consuming component 8 can be saved until further notice.

Figure 2:
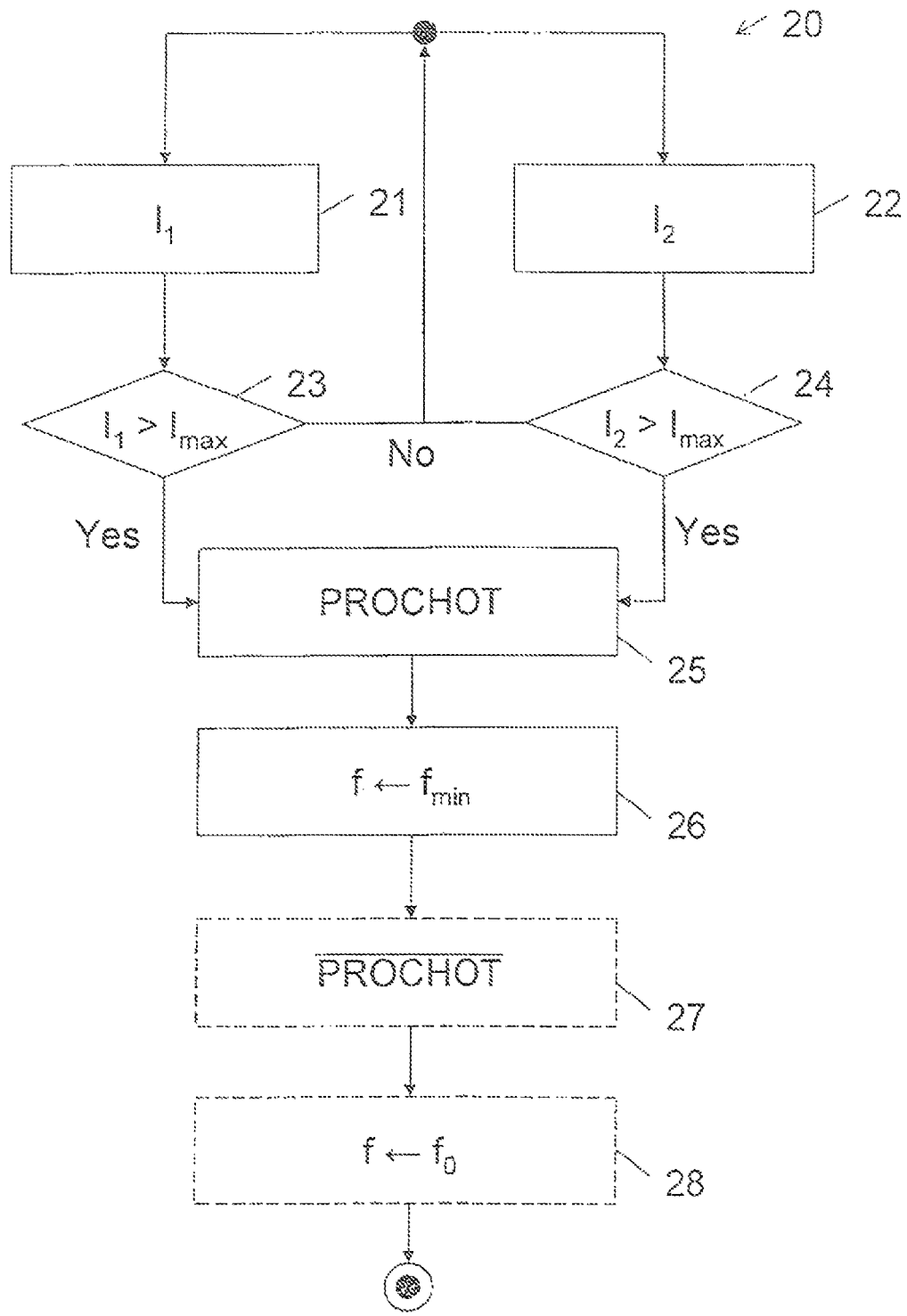
FIG. 2 shows a flowchart of a method for controlling an assembly.

Before further measures for operating the assembly in a restricted operating mode and measures for restoring the normal operating mode are described, the basic control method is explained using the flowchart in FIG. 2.

In steps 21 and 22, an output variable of a first power supply unit 1A and of a second power supply unit 1B is detected. This may be, for example, the instantaneous output current or an instantaneous output power of the respective power supply unit 1A or 1B. Alternatively, the level of an instantaneous operating voltage or another parameter may also be monitored.

In subsequent steps 23 and 24, a check is carried out to determine whether the detected parameter is above a respective limit value. On the basis of the example of FIG. 1, a check is carried out to determine whether the first output current I1 or the second output current I2 of the first power supply unit 1A or of the second power supply unit 1B is above a maximum permissible limit value Imax. If this is not the case, the method is continued again with steps 21 and 22.

If one of the detected parameters is above a permissible limit value, a suitable control signal is generated in a step 25. For example, a predetermined voltage potential may be transmitted to an external connection pin of a processor, for example the so-called "PROCHOT" pin which is usually used to signal a thermal overload situation.

In response to the control signal, a power-consuming component 8, for example a processor, reduces its power consumption. For example, an internal clock generation or duplication circuit may be configured in such a manner that a processor core is supplied only with a minimum operating clock at a frequency $f_{min}$. For example, the minimum operating clock may be only 12.5% of a fundamental frequency $f_0$ of the normal operating clock. This makes it possible to continue to operate a power-consuming component 8 in a restricted operating mode, even when a power supply device 1 fails, without the need for a redundant power supply device 1.

If all of the power supply units 1A and 1B are available again or if the power consumption of the assembly being monitored was reduced in another manner, the power-consuming component 8 can be switched back into the normal operating mode by a suitable control signal in an optional step 27. For example, the control signal at the connection pin PROCHOT can be withdrawn, with the result that the throttling of a processor core is canceled or at least reduced. For example, instead of the extreme, hardware-based throttling by means of the PROCHOT signal, an intermediate, software-based throttling can be applied.

In step 28, the operating clock of the power-consuming component is then increased again to the normal frequency $f_0$ which is greater than the reduced frequency $f_{min}$.

Figure 3:
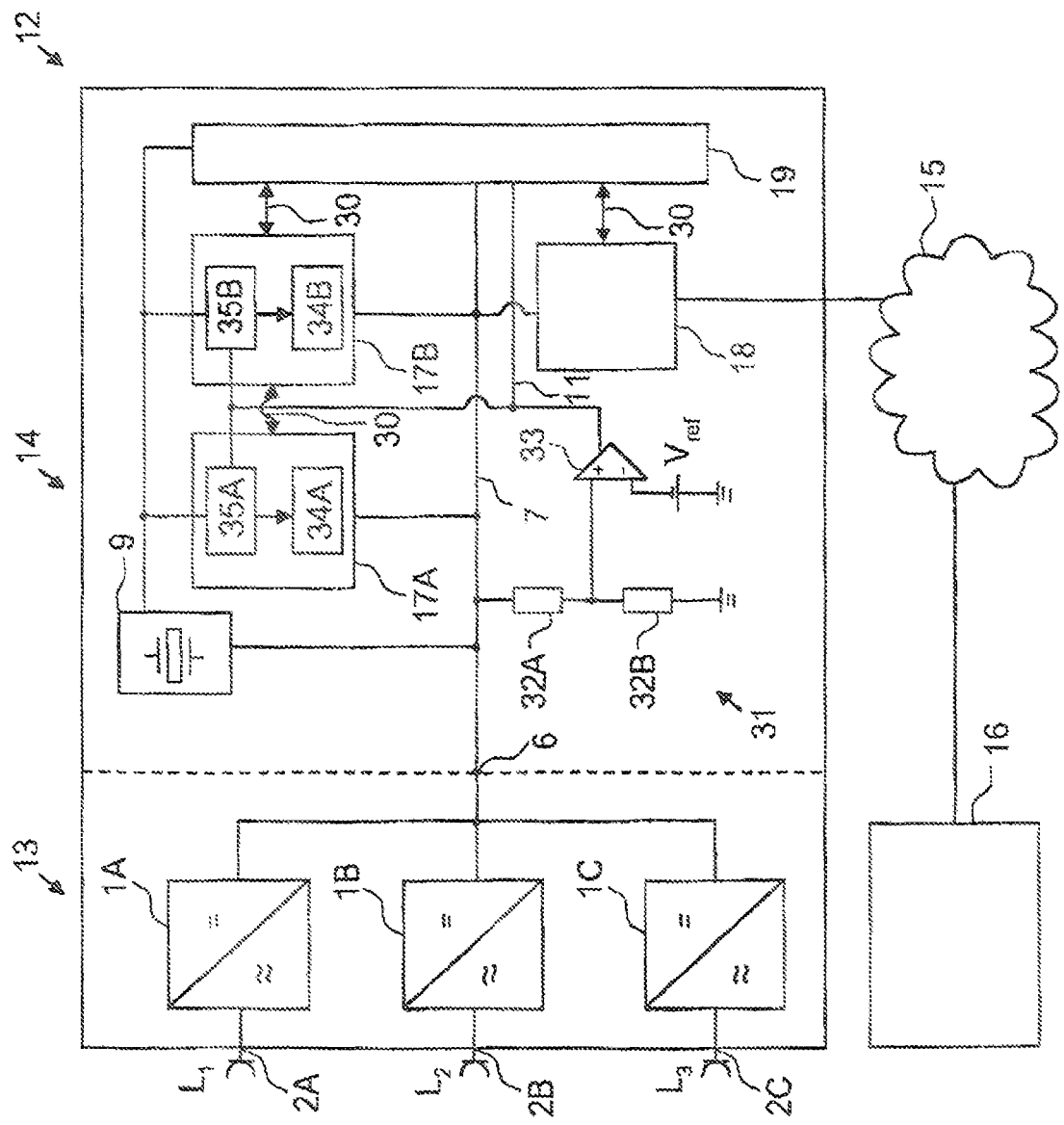
FIG. 3 shows a computer system having an assembly.

FIG. 3 shows a computer system 12 comprising a supply component 13 and a computer unit 14. The computer system 12 is connected to a remote maintenance system 16 via a data network 15.

The supply component 13 of the computer system 12 comprises three power supply units 1A to 1C connected to different phases of a multiphase power supply network by associated voltage inputs 2A to 2C. Each of the power supply units 1A to 1C comprises a converter circuit (not illustrated in FIG. 3) and converts the input-side supply voltage into an output-side DC voltage and provides it at a common voltage output 6 of the supply component 13.

The computer unit 14 of the computer system 12 is supplied with an operating voltage via the voltage output 6. In particular, the operating voltage is supplied to two processors 17A and 17B, to a communication apparatus 18, to a management component 19 and to a primary clock generation circuit 9 via a power supply line 7. The primary clock generation circuit 9 Supplies the processors 17A and 17B and the management component 19 with an external clock signal.

Each of the processors 17A and 17B comprises a processor core 34A and 34B and a secondary clock generation apparatus 35A and 35B. For example, the secondary clock generation apparatus 35A and 35B is a clock ratio defining means or a clock multiplier which uses the external operating clock of the primary clock generation circuit 9 to produce an internal operating clock for the processor core 34A and 34B which is a multiple of the external operating clock. Other clock generation or conversion circuits which generate or define an internal Operating clock of the processor cores 34A and 34B are possible.

The management component 19 is connected to the processors 17A and 17B and to the communication apparatus 18 via a data bus 30. The management component 19 can be used to interrogate and, if necessary, change operating states of the individual components of the computer unit 14. For example, the management component 19 is a so-called "service management" module on which a control program which is independent of the processors 17A and 17B and is intended to monitor the computer unit 14 runs. Alternatively, management software can also be executed on one of the processors 17A or 17B instead of a separate monitoring module. The communication apparatus 18 makes it possible to signal operating states and to also perform remote maintenance on the computer system 12 from the remote maintenance system 16 via the data network 15.

To ensure reliable operation of the computer unit 14 even when one of the power supply units 1A to 1C fails, for example on account of failure of one of the plurality of phase lines L1 to L3, the computer unit 14 has a voltage monitoring circuit 31 which monitors the operating voltage of the computer system 12, which voltage is emitted via the voltage output 6. Alternatively, or in addition, the voltage of the different phase lines L1 to L3 is monitored. In the example illustrated, the voltage monitoring circuit 31 comprises a voltage divider 32 comprising a first resistor 32A and a second resistor 32B which are connected between the power supply line 7 and a known reference potential, for example, ground. The center tap of the voltage divider 32 is connected to a comparator 33 which compares the voltage which has been tapped off with a fixed reference voltage $V_{ref}$. If the voltage of the power supply line 7 falls below a predetermined level, for example, because, one of the three phase lines L1 to L3 or associated three power supply units 1A to 1C fails, the comparator 33 generates a control signal at its output. The control signal from the comparator 33 is supplied both to the first and second processors 17A and 17B and to the management component 19 via a control line 11.

If the voltage monitoring circuit 31 detects a voltage drop on the power supply line 7 upon failure of the power supply units 1A and signals said voltage drop to the processors 17A and 17B via the control line 11, the clock ratio defining means 35A and 35B reduce the operating clock of the processor cores 34A and 34B. This reduces the power consumption of the processors 17A and 17B, with the result that the remaining functional power supply units 1B and 1C can still supply the computer system 12 with a sufficient operating current. In this case, processes executed on the processor cores 34A and 34B continue to run, albeit at reduced speed, with the result that there is no considerable disruption to the computer system 12.

In addition, the management component 19 detects that one of the power supply units 1A to 1C has failed and, in one advantageous, refinement, signals this fault state to the remote maintenance system 16 via the communication apparatus 18 and the data network 15.

the management component 19 may automatically take further measures to reduce the power consumption of the computer unit 14. For example, components which are not absolutely necessary for Operating the computer unit 14 can be switched off. In the example illustrated in FIG. 3, a process executed on the second processor core 34B, for example, can be transferred to the processor core 34A of the first processor 17A and the second processor 17B can then be completely switched off. If the power consumption of the computer unit 14 was reduced via these measures or comparable measures to such an extent that a reliable power supply is ensured using the remaining power supply units 1B and 1C, the control signal 11 can be withdrawn and the full internal operating frequency can again be applied to the first processor core 34A which is still operating by the secondary clock generation circuit 35A.

To restore the full performance of the computer system 12, a service engineer called using the remote maintenance system 16 can replace the defective power supply unit 1A and restore a supply of a suitable supply voltage. After the maintenance work has been concluded, the second processor 17B can then be activated again by the management component 19. This may be carried out automatically, for example, by the voltage monitoring circuit 31 automatically detecting a voltage rise on the power supply line 7 and by corresponding program code of the management component 19 or may be initiated manually by the service engineer, for example, via the remote maintenance system 16.

One advantage of the example illustrated in FIG. 3 is that the voltage monitoring 31 in the form of a hardware circuit can react in a particularly rapid manner to failure of one of the power supply units 1A to 1C and can almost immediately reduce the power of the computer unit 14 using a suitable control signal. For example a PROCHOT signal can be applied to the processors 17A and 17B, resulting in a reduction of their relative input power from 100% to 12.5% within a few milliseconds, e.g. 5 or 10 ms. In the embodiment shown in FIG. 3, there is no need for separate communication or a separate control line between the supply component 13 and the computer unit 14 for this purpose. In another embodiment, in which a monitoring circuit is provided within each one of the power supply units 1A to 1C, a corresponding control output connected to a separate control line may be used to indicate a power source or power supply failure to the computer unit 14 and its components like the processors 17A and 17B and the management component 19.

Further, complex measures for operating the computer system until a maintenance engineer arrives can be carried out in conjunction with the downstream and possibly slower monitoring and configuration of the computer unit 14 by the management component 19. In particular, the voltage monitoring circuit 31 can be arranged in the vicinity of the processors 17A and 17B and can be dimensioned in such a manner that it already responds before the input voltage tolerance of the processors 17A and 17B has been undershot. Reliable operation of the computer system 12 can thus always be ensured.

According to one embodiment, in a subsequent phase, each one of the processors 17A and 17B may then be configured by means of software operations to operate in one of a plurality of different performance states. Such performance states, sometimes referred to as P-states, are often predefined by a manufacturer of a particular processor. For example, the Core Duo processor of the Intel Corporation can be operated in the so-called P0-state, i.e. the performance state with the highest possible performance, with an operating frequency of the processor cores of 2.3 GHz, and in the so-called P1-state, i.e. a state with a lower performance, with an operating frequency of 980 MHz. In addition, a voltage operating point of a processor or its processor core may also be changed in accordance with the selected performance state. For example, the Intel Pentium M 1.6 GHz Processor provides six different performance modes P0 to P5 with operating frequencies ranging from 1.6 MHz (P0) to 600 MHz (P5) and operating voltages between 1.484 V (P0) and 0.956 V (P5) respectively. In this way, modern processors may provide a plurality of possible performance states with varying operating frequencies and voltages resulting in a plurality of different electrical power requirements.

In one embodiment, the voltage monitoring circuit 31 provides the PROCHOT signal in response to a failure of the power supply unit 1A as described above. In addition, upon detection of this control signal, the management component 19 may reconfigure the processors 17A and 17B to operate in a different performance state. For example, if the processors have been operated in the highest possible performance state P0, they may be reconfigured to operate in a lower performance state, e.g. in the P1 state.

According to one embodiment, all processors 17A and 17B of the computer system 12 are switched to a predetermined performance state, in particular the lowest performance state, i.e. the P-state with the highest number drawing the lowest input power. Subsequently, the PROCHOT control signal may be disabled. For example, the voltage monitoring circuit 31 may detect that the operating voltage returns to a valid range as a result of the reduced power consumption of the processors 17A and 17B. Alternatively, the control signal may be reset directly by the management component 19. In an optional step, the management component 19 may identify the type or number of power supplies 1B and 1C still operational and select a performance state of the processors 17A and 17B accordingly. For example, one processor 17A may be operated at in the P1 state and the other processor 17B may be operated in the P2 state to achieve a maximum performance possible with a given output performance of the remaining power supplies 1B and 1C.

Figure 4A:
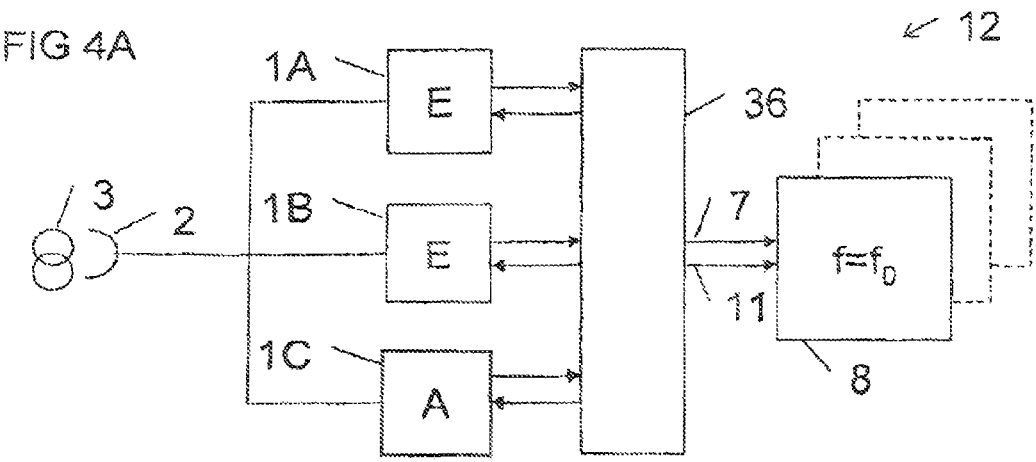
FIG. 4 shows different operating situations of an assembly.
Figure 4B:
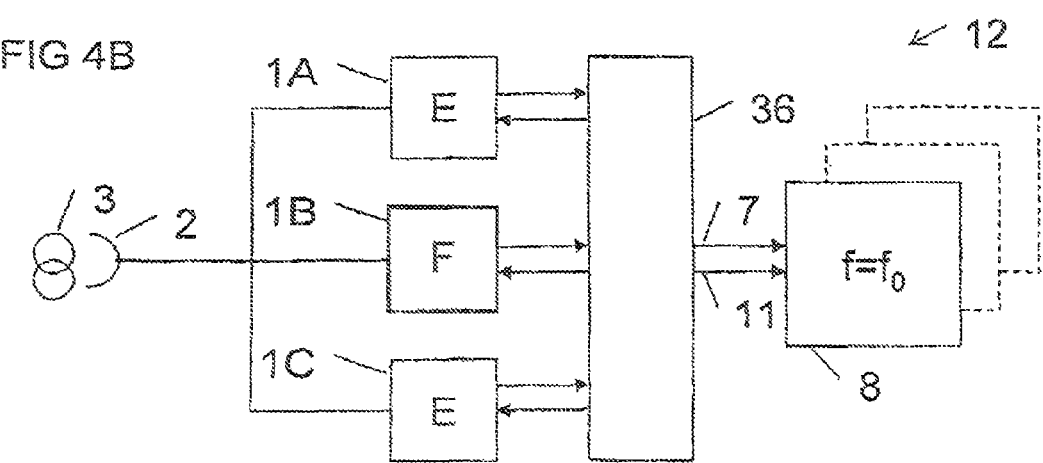
Figure 4C:
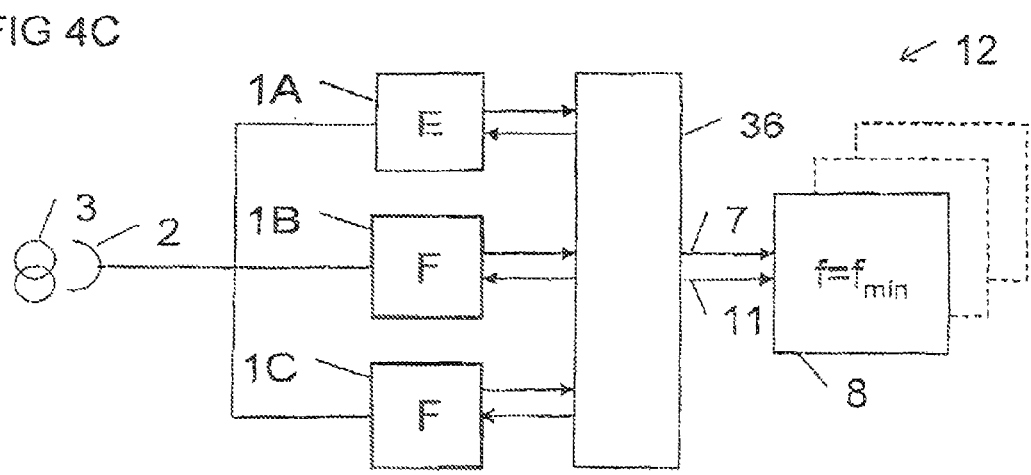

FIGS. 4A to 4C illustrate different operating states of a further computer system 12 having three redundant power supply units 1A to 1C. The power supply units 1A to 1C are connected to a supply voltage 3, for example a mains AC voltage, via a common voltage input 2.

On the output side, the power supply units 1A to 1C are connected to a common control circuit 36 which monitors the operation of the power supply unit 1A to 1C. The control circuit 36 is also set up to deliberately switch the individual power supply units 1A to 1C on and off. For example, a suitable control signal can be transmitted from the control circuit 36 to each individual power supply unit of the power supply units 1A to 1C for this purpose. The power supply units 1A to 1C can be switched off, for example, by interrupting a clock signal for driving a switching converter or by disconnecting the converter circuit from the voltage input 2 by means of an electronic or electromechanical relay.

The control circuit 36 is also connected, via a power supply line 7 and a control line 11, to one or more power-consuming components 8, for example a processor or a so-called "server blade", which can be operated in a normal operating mode and a restricted operating mode.

In the example illustrated, each of the power supply units 1A to 1C has an output power of 50 W, for example. The power-consuming component 8 consumes a power of 100 W, for example, in the normal operating mode. In contrast, the power-consuming component 8 only consumes a power of 50 W in the restricted operating mode.

To ensure particularly efficient operation of the computer system 12, the control circuit 36 generally activates only two of the three available power supply units 1A to 1C. For example, in the situation illustrated in FIG. 4A, the third power supply unit 1C is deactivated, while the power supply units 1A and 1B are activated. The power-consuming component 8 is operated in a normal operating mode, that is to say with full power consumption, in this situation.

In the situation illustrated in FIG. 4B, the second power supply unit 1B has been deactivated as a result of the occurrence of a fault. The control circuit 36 detects the presence of a fault in the second power supply unit 1B and automatically activates the third power supply unit 1C to compensate for the failure of the second power supply unit 1B. The power-consuming component 8 can thus still be operated in the first operating mode with full power even when one of the power supply units 1A to 1C fails.

In a further embodiment, the power-consuming component 8 is throttled during the switch-over from the second power supply unit 1B to the third power supply unit 1C. For example, assume that it takes 100 ms to start the third power supply unit 1C, but that the remaining power supply unit 1A can only keep the operating voltage of the power-consuming component 8 stable for 10 ms. In this case, immediately upon detecting the failure of the second power supply unit 1B, the control circuit 36 sends a control signal to the power-consuming component 8 to switch it temporarily into the restricted operating mode within a very short time-span, for example within 5 ms. In addition, the third power supply unit 1C is activated. Once the control circuit detects that the third power supply unit 1C is generating a stable output voltage, it can switch the power-consuming component 8 back into its normal operating mode.

In the situation illustrated in FIG. 4C, the third power supply unit 1C has also failed in addition to the second power supply unit 1B. In this case, the control circuit 36 cannot compensate for the failure of the further power supply unit 1C. To avoid the only remaining power supply unit 1A from being overloaded, it provides the power-consuming component 8 with a suitable control signal via the control line 11. The power-consuming component 8 is then changed to a restricted operating mode, for example, by reducing an operating frequency f to a minimum operating frequency $f_{min}$, in which operating mode the power consumption of the power-consuming component falls to 50 W. Constant operation of the computer system 12 can thus be ensured even when two of the three power supply units 1A to 1C fail.

As described above, the example illustrated in FIGS. 4A to 4C has a high level of failure safety. At the same time, the three power supply units 1A to 1C can be operated in the vicinity of their maximum output power and thus with the greatest possible efficiency in each of the situations described. In addition, there is no need for each of the power supply units 1A to 1C to be dimensioned in such a manner that they alone can provide the operation of the power-consuming component 8 in the normal operating mode.

The system described with reference to FIGS. 4A to 4C and the control and monitoring apparatus generally described herein are particularly suitable for operating modular server computers. For example, blade servers have a plurality of server blades which are largely independent of one another and have one or more processors arranged on the latter for processing tasks of the computer system. Blade servers likewise generally comprise a plurality of power supply units which can be operated largely independently of one another and provide the operating voltage for the server blades and other installed components. The power consumption of the blade server can be adapted to the available power supply units, by switching off individual processors or server blades, changing their performance states, or reconfiguring the blade server as a whole, for example, by redistributing the tasks to other server blades, in particular fewer server blades, without questioning the operational reliability of the blade server.

It is pointed out that the illustrated configurations are example computer systems whose features can be combined with one another in virtually any desired manner. Other computer systems having more than two or three power supply units and power-consuming components can also be monitored and controlled in the described manner.

The invention claimed is:

1. A computer system comprising:
   at least two power supply units that provide an output-side operating voltage from at least one input-side supply voltage,
   at least one power-consuming component which can be operated in at least one normal operating mode with a first power consumption and in a restricted operating mode with at least one second power consumption which is lower than the first power consumption, the power-consuming component being electrically coupled to the at least two power supply units, wherein the at least one power-consuming component comprises at least two processor cores;
   control means coupled to the at least two power supply units and to the power-consuming component and set up to monitor the function of the at least two power supply units and switch the power-consuming component from the normal operating mode into the restricted operating mode immediately upon failure of at least one power supply unit to reduce the power consumption of the power-consuming component,
   wherein the control means comprise at least one monitoring apparatus in the form of a hardware circuit to generate a predetermined hardware control signal upon occurrence of a failure or upon exceeding of a threshold level of at least one power supply unit and a throttle apparatus coupled to the monitoring apparatus, the throttle apparatus comprises a clock generation circuit that supplies the at least two processor cores with an operating clock, the at least two processor cores being supplied with a first operating clock in the normal operating mode by the clock generation circuit and being supplied with a second, lower operating clock in the restricted operating mode; and
   at least one management component coupled to the control means and set up to detect a fault state when at least one power supply component fails and to subsequently change a configuration of the computer system by software operations upon detecting the fault state to reduce a power consumption of the computer system, wherein changing the configuration comprises transferring a process executed on a second processor core of the at least two processor cores to a first processor core of the at least two processor cores and deactivating the second processor core; and withdrawing the predetermined hardware control signal, if the power consumption of the computer system has been reduced to such an extent that a reliable power supply is ensured using the remaining operational power supply units.

2. The computer system according to claim 1, wherein the at least two processor cores and the clock generation circuit are arranged in a processor, the processor having at least one connection pin for applying the predetermined control signal.

3. The computer system according to claim 1, wherein each one of the at least two power supply units comprises a monitoring apparatus which is intended to monitor a permissible output power or a permissible output current and is set up to generate the predetermined control signal upon detecting that the permissible output power or the permissible output current has been exceeded.

4. The computer system according to claim 1, wherein the management component can be coupled to a remote maintenance system via a communication apparatus and is set up to signal the fault state to the remote maintenance system.

5. The computer system according to claim 1, wherein the computer system forms a modular blade server system comprising a plurality of server blades, wherein changing the configuration comprises a re-assignment of tasks to other server blades, in particular a subgroup of previously used server blades.

6. A computer system comprising:
   at least two power supply units that provide an output-side operating voltage from at least one input-side supply voltage, at least one power-consuming component which can be operated in at least one normal operating mode with a first power consumption and in a restricted operating mode with at least one second power consumption which is lower than the first power consumption, the power-consuming component being electrically coupled to the at least two power supply units;

control means coupled to the at least two power supply units and to the power-consuming component and set up to monitor the function of the at least two power supply units and switch the power-consuming component from the normal operating mode into the restricted operating mode immediately upon failure of at least one power supply unit to reduce the power consumption of the power-consuming component; and at least one management component coupled to the control means and set up to detect a fault state when at least one power supply component fails and to subsequently change a configuration of the computer system by software operations upon detecting the fault state to reduce a power consumption of the computer system;

wherein the control means comprise at least one monitoring apparatus in the form of a hardware circuit to generate a predetermined control signal upon occurrence of a failure or upon exceeding of a threshold level of at least one power supply unit and a throttle apparatus coupled to the monitoring apparatus and wherein the control means is set up to throttle the power-consuming component within 10 ms of the failure or exceeding of the threshold; and wherein a voltage output of each one of the at least two power supply units is coupled with a power supply line of the computer system such that upon failure of a first power supply unit, the output current of the second power supply unit rises abruptly, and wherein exceeding the permissible output power or the permissible output current of the second power supply unit indicates failure of the first power supply unit.

7. The computer system according to claim 6, wherein the at least one monitoring apparatus has a voltage monitoring circuit which is set up to compare the output-side operating voltage with a predetermined threshold value and to generate the predetermined control signal when the predetermined threshold value is undershot.

8. A computer system comprising:
at least two power supply units that provide an output-side operating voltage from at least one input-side supply voltage, at least one power-consuming component which can be operated in at least one normal operating mode with a first power consumption and can be operated in a restricted operating mode with at least one second power consumption which is lower than the first power consumption, the power-consuming component being electrically coupled to the at least two power supply units;

control means coupled to the at least two power supply units and to the power-consuming component and set up to monitor the function of the at least two power supply units and switch the power-consuming component from the normal operating mode into the restricted operating mode immediately upon failure of at least one power supply unit to reduce the power consumption of the power-consuming component; and at least one management component coupled to the control means and set up to detect a fault state when at least one power supply component fails and to subsequently change a configuration of the computer system upon detecting the fault state to reduce a power consumption of the computer system, wherein a voltage output of each one of the at least two power supply units is coupled with a power supply line of the computer system such that upon failure of a first power supply unit, the output current of the second power supply unit rises abruptly, and wherein exceeding the permissible output power or the permissible output current of the second power supply unit indicates failure of the first power supply unit.

9. A method of controlling a computer system comprising at least two processor cores as a power consuming component and at least two power supply units that provide an operating voltage for the at least two processor cores, wherein the at least two processor cores are operated with a first operating clock in a normal operating mode, the method comprising:

monitoring, by at least one monitoring apparatus, the at least two power supply units for a failure;

generating, by the at least one monitoring apparatus, a predetermined hardware control signal, if a failure of at least one power supply unit has been detected;

immediately throttling, by a throttle apparatus, the at least two processor cores to operate with a second operating clock if the predetermined hardware control signal has been detected, wherein the second operating clock is lower than the first operating clock;

changing, by at least one management component, a configuration of the computer system by software operations if the predetermined hardware control signal has been detected to adapt power consumption of the computer system to the remaining operational power supply units, wherein changing the configuration comprises transferring a process executed on a first processor core to a second processor core and deactivating the second processor core; and withdrawing the predetermined hardware control signal, if the power consumption of the computer system has been reduced to such an extent that a reliable power supply is ensured using the remaining operational power supply units.

10. The method according to claim 9, wherein changing the configuration comprises powering off at least one component of the computer system, which is non-essential for the operation of the computer system.

* * * * *